United States Patent [19]

Rockwell et al.

[11] Patent Number: 4,880,295

[45] Date of Patent: Nov. 14, 1989

[54] OPTICAL DEVICE ENHANCEMENT METHOD AND APPARATUS BY CONTROL OF STIMULATED BRILLOUIN SCATTERING GAIN

[75] Inventors: David A. Rockwell; Metin S. Mangir, both of Santa Monica; Jeffrey O. White, Malibu; Dennis C. Jones, Westchester, all of Calif.

[73] Assignee: Hughes Aircraft Company, Los Angeles, Calif.

[21] Appl. No.: 111,941

[22] Filed: Oct. 21, 1987

[51] Int. Cl.$^4$ .............................................. G02F 1/00
[52] U.S. Cl. .......................................... 350/354; 372/21
[58] Field of Search .................... 350/354; 372/21, 97, 372/99

[56] References Cited

U.S. PATENT DOCUMENTS 4,233,571 11/1980 Wang et al. ........................... 372/21
4,529,273 7/1985 Galomb et al. ...................... 350/354
4,699,452 10/1987 Mollenauer et al. ............. 350/96.16

OTHER PUBLICATIONS

N. Bloembergen, "The Stimulated Raman Effect", American Journal of Physics, vol. 35, no. 11, Nov. 1967, pp. 989-1023.

C. Giuliano, "Application of Optical Phase Conjugation", Physics Today, Apr. 1981, pp. 27-35 (reprint pp. 1-8).

A. Yariv, "Phase Conjugate Optics and Real-Time Holography", IEEE J. Quantum Electronics, vol. QE 14, no. 9, 1978, pp. 650-660.

W. H. Lowdermilk, "Stimulated Concentration Scattering in the Binay-Gas Mixtures Xe-He and SF$_6$HE+", Physical Review, vol. 5, no. 3, Mar. 1972, pp. 1423-1443.

L. D. Landau et al., "Fluid Mechanics", vol. 6, of Course of Theoretical Physics, Permagon Press, 1959, pp. 298-303.

R. D. Mountain, "Light Scattering form Binary Solutions", J. Chem. Physics, vol. 50, 1969, pp. 1103-1108.

R. D. Mountain, "Spectral Distribution of Scattered Light in a Simple Fluid", Rev. of Modern Physics, vol. 38, no. 1, Jan. 1966, pp. 205-214.

R. D. Mountain, "Density Fluctuations in Fluids Having an Internal Degree of Freedom", J. of Res. NBS 72A, 1968, pp. 95 to 100.

R. Y. Chiao et al., "Brillouin Scattering and the Disperson of Hypersonic Waves", Physics of Quantum Electronics, 1966, pp. 241-252.

Zeoldovich, "Principles of Phase Conjugation", pp. 91-93.

Y. Aoki et al., "Stable CW Backward Raman Amplification in Optical Fibers by Stimulated Brillouin Scattering Suppression", Applied Optics, vol. 25, no. 7, Apr. 1, 1986, pp. 1056-1060.

Primary Examiner—Eugene R. Laroche
Assistant Examiner—Nathan W. McCutcheon
Attorney, Agent, or Firm—V. D. Duraiswamy; A. W. Karambelas

[57] ABSTRACT

The output of an optical device which involves a stimulated brillouin scattering (SBS) gain medium is enhanced over a range of input beam intensities by providing a gain medium which has a given SBS gain for a given input beam intensity, and modifying the gain medium to reduce its SBS gain coefficient. By lowering the SBS gain coefficient, SBS dominance and suppression of stimulated Raman scattering (SRS) can be mitigated, and the output fidelity of a phase conjugation system with respect to its input can be significantly enhanced. Mechanisms for reducing the SBS gain coefficient include increasing the medium viscosity, thermal conductivity and/or diffusion coefficient, or causing the medium relaxation zone to coincide with the frequency of the phonons involved in the SBS process. Two different media can be mixed together in varying proportions to progressively modify the overall medium SBS gain as the input beam intsnsity is progressively changed.

30 Claims, 5 Drawing Sheets

OPTICAL DEVICE ENHANCEMENT METHOD AND APPARATUS BY CONTROL OF STIMULATED BRILLOUIN SCATTERING GAIN

GOVERNMENT RIGHTS

The U.S. Government has rights in this invention pursuant to Contract No. DAAH01-84-A052, awarded by the Department of the Army.

BACKGROUND OF THE INVENTION

1. Field of the Invention

This invention relates to methods and apparatus for enhancing the operation of optical devices which involve stimulated Brillouin scattering gain media, and more particularly to increasing the output energy of stimulated Raman scattering devices and increasing the conjugation fidelity of phase conjugate mirrors (PCM).

2. Description of the Related Art

Several optical devices are known which involve stimulated Brillouin scattering (SBS). For purposes of the present invention, devices employing stimulated Raman scattering (SRS) and phase conjugation are of greatest interest. The SRS phenomenon is described in, among other places, N. Bloembergen, "The Stimulated Raman Effect", American Journal of Physics, Vol. 35, November 1967, pp. 989-1023. A review of various applications for optical phase conjugation is presented by Giuliano in Physics Today, "Applications of Optical Phase Conjugation", April 1981, pages 27-35. A general review of the phase conjugation field is given in A. Yariv, IEEE, J. Quantum Electronics QE14, 650 (1978).

These devices rely upon the formation of optical "gratings" (i.e., periodic spatial variations in the optical properties) in a nonlinear optical medium. The Raman effect may be described as the scattering of light from matter, such as a gas, liquid or solid, with a shift in wavelength from that of the usually monochromatic incident radiation. The internal degrees of freedom (for example, electronic, vibrational, or rotational) of atoms or molecules of the medium couple with the incident radiation such that spatial variations within the medium result in a scattering of the incident radiation. This follows from the fact that the optical properties of the molecules vary with the excitation of their internal degrees of freedom.

Phase conjugation is an optical phenomenon that has attracted considerable attention in recent years. Several different ways of producing phase conjugated beams have been discussed in the literature, including four-wave mixing, SBS, SRS, three-wave mixing, photon echo devices and self-pumped PCMs. Basically, a PCM produces a retroreflection of an incident beam, with the phase of the reflected wavefront reversed with respect to that of the incident beam. PCMs can be provided either with external pumping beams, as in four-wave mixer devices, or as "self-pumped" devices in which external pumping beams are eliminated. Of the self-pumped PCMs, those employing SBS are generally used in connection with high power pulsed laser beams.

Serious problems have been identified for both SRS and SBS devices. In Raman devices, many gaseous media that could yield desirable wavelengths cannot be used because SBS is produced to a degree that swamps and suppresses the Raman process. In principle, SBS might be suppressed in Raman-active media by mode-locking the pump laser. However, this approach has not been demonstrated and would require a substantial redesign of the pump laser; it could also eliminate the SBS phase conjugation which often serves an essential function in the pump laser. In addition, it would increase the system complexity and the risk of optical damage.

With PCMs it has been difficult to maintain a good fidelity of the phase conjugated beam to the input beam at higher operating energies. Ideally, the phase conjugated beam should have a wavefront which mirrors that of the input beam but with a phase reversal. However, it has been found that as the input beam energy and intensity go up, the wavefront of the reflected beam increasingly diverges from that of the input beam.

The effect of the stimulation medium upon various stimulated phenomena has been a subject of investigation. Experiments on the correctness of the hydrodynamic equations in describing the behavior of binary gas mixtures under conditions of varying partial pressures, total pressures and stimulation frequency were related in W. H. Lowdermilk and N. Bloembergen, "Stimulated Concentration Scattering in the Binary-Gas Mixtures Xe-He and $SF_6$-He", Physical Review, Vol. 5, No. 3, March 1972, pp. 1423-1443. In particular, this article reported what was believed to be the first unambiguous demonstration of stimulated concentration scattering (SCS), and the conditions under which SCS would not be dominated by SBS. It purported to confirm the theory that the most favorable condition for SCS occurs in a mixture of gases in which the two constituent molecules have a large difference in mass and optical polarizability. The threshold of SBS was found to increase by mixing gases with a large difference of component masses. Experiments were conducted with various mixtures of $SF_6$ and He and of Xe and He. As He was added, the maximum stimulated gain was found to decrease rather rapidly. For relative He concentrations less than 60%, the frequency shift of backscattered light was characteristic of SBS. Above 60% He concentration, a rapid decrease in the frequency shift took place that was characteristic of SCS. The complete coupled mode gain, the Brillouin gain, the concentration gain and the electrocaloric thermal gain were plotted as functions of He concentration in a He-Xe mixture. The uncoupled concentration gain was found to become approximately equal to the Brillouin gain at a relative concentration of 90% He. This work, however, did not propose any solutions to the SRS suppression or phase conjugate fidelity problems mentioned above.

SUMMARY OF THE INVENTION

In view of the above problems, the principal purpose of the present invention is to provide a method and apparatus for enhancing, over a range of input beam intensities, the output of optical devices which employ an SBS gain medium to couple with a variable intensity input beam and produce a modified output beam. Specific applications of the invention include a reduction of SBS dominance in SRS devices and a greater return beam fidelity in PCMs, at higher input beam energy ranges.

These and other purposes are achieved by providing a medium which has a given SBS gain, G, for a given input beam intensity, and then modifying the medium to reduce its SBS gain coefficient, g, thereby maintaining the same overall gain G with greater input beam intensities. The medium is preferably modified by altering its composition to reduce the SBS gain coefficient when the input energy increases. The SBS gain coefficient can be reduced by reducing the medium density, by increasing the medium viscosity, thermal conductivity or diffusion coefficient, by altering the medium so that the relaxation rates of internal degrees of freedom (e.g. rotational and vibrational) roughly coincide with the frequency of the phonons involved in the SBS process, or by a combination of the above approaches.

In one implementation, the gain medium is modified by mixing in progressively larger amounts of a second medium which has a smaller SBS gain coefficient. The SBS gain medium is preferably gaseous, but may also be liquid or solid. For an SRS device, the SBS gain coefficient is made sufficiently low to avoid SBS dominance at the desired input beam intensity. For a PCM, the medium is tailored so that its SBS gain is sufficiently low to produce an output beam having a desired degree of fidelity to the input beam at the input energy level.

These and other features and advantages of the invention will be apparent to those skilled in the art from the following detailed description of preferred embodiments, taken together with the accompanying drawings, in which:

DETAILED DESCRIPTION OF PREFERRED EMBODIMENTS

Figure 1:
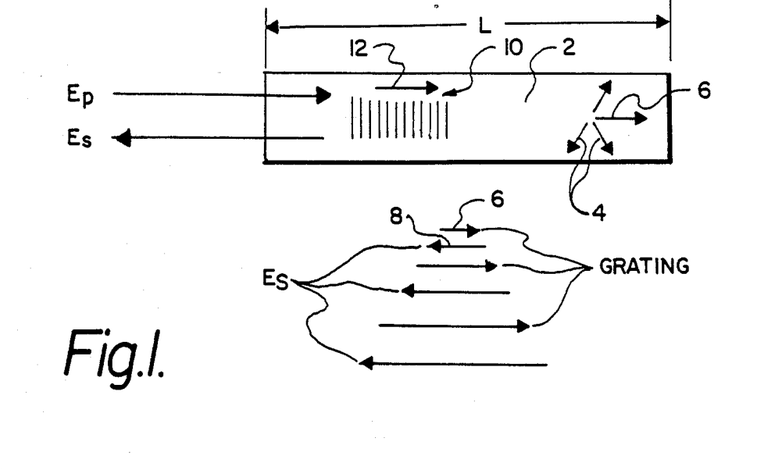
FIG. 1 is a block diagram illustrating the establishment of gratings and a Stokes beam in an SBS medium.

FIG. 1 illustrates the establishment of optical gratings in an SBS medium. Depending upon the character of the medium and its inputs, SRS can also be produced. The effective length of the medium 2 is designated L. For Raman applications in which the medium molecules should have characteristic vibrational energies within a certain range, gases such as $H_2$, $D_2$, $CH_4$, $CF_4$, $O_2$, $N_2$ and $CD_4$ are typical; they produce Raman scattering with an appreciable wavelength shift in the output. For phase conjugation applications gases such as $N_2$, Xe, $CH_4$ and $SF_6$ are common, although various other media have also been used.

An input optical pump beam $E_p$ is directed into the medium to stimulate the molecules therein. When $E_p$ is first applied, there will already be existing within the medium random thermal noise phonons (sound waves) 4, with random directions and wavefronts. Thermal noise waves exist in virtually all material media at temperatures above absolute zero. The energy of the thermal noise waves is initially quite weak, typically many orders of magnitude less than the pump beam energy. However, several of the thermal noise waves will be sufficiently aligned with the input beam by random chance so that one of them will have the correct properties to generate the conjugate of the input beam; this wave is indicated by reference numeral 6. The aligned thermal noise wave 6 couples with the incoming pump beam $E_p$ to produce a weak return Stokes beam $E_s$. The weak $E_s$ in turn couples with the input beam to increase the amplitude of the initial aligned thermal noise wave, which in turn inreases $E_s$, which in turn increases the phonon amplitude, etc.

The rapid buildup of phonons within the medium and of the counter-propagating Stokes beam $E_s$ is schematically illustrated in the diagram immediately below SBS gain medium 2. The initially small thermal noise phonon wave 6 and small $E_s$ 8 are indicated at the top of the diagram; they progressively build up in magnitude (towards the bottom of the diagram) during continued application of the pump beam $E_p$. The full $E_s$ rapidly builds up, typically to the order of about 50% of the energy in the input pump beam $E_p$. A periodic pattern of "gratings" in the form of sonic wavefronts 10 is thus produced in the gain medium, moving in the direction of $E_p$ (indicated by arrow 12). The frequency of $E_s$ will be slightly less than that of $E_p$, due to a Doppler shift caused by the moving phonons.

Figure 2:
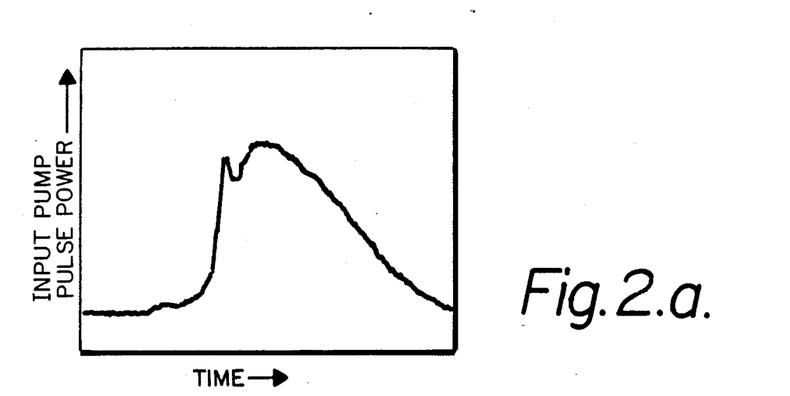
FIGS. 2(a), 2(b) and 2(c) are graphs showing the power over time associated with an input pump beam, the SRS output, and the SBS output, respectively, in an SRS device in which SBS competition is exhibited.

It has been discovered that, with a Raman gas such as $CH_4$, the SRS frequency-shift process begins early during the pump pulse, but is suppressed and dominated within a few nanoseconds by the onset of SBS. This phenomenon is illustrated in FIGS. 2(a)–(c), which show the evolution of the incident pump beam and the backward Raman and SBS pulses for $CF_4$ over time at a pressure of 2100 psi for a 532 nm pulse. FIG. 2(a) shows the input pump pulse, FIG. 2(b) shows the SRS response, and FIG. 2(c) shows the SBS response. Because of its relatively slow temporal response, significant SBS conversion is slightly delayed, during which time the SRS process proceeds as indicated by spike 14 in FIG. 2(b). However, once the transient SBS gain exceeds the SRS gain, SBS quickly becomes the dominant process and SRS is suppressed. This phenomenon has been observed in many gases, including, for example, $CF_4$, having a Raman shift of 908 $cm^{-1}$, and $O_2$, having a Raman shift of 1556 $cm^{-1}$.

Figure 3:
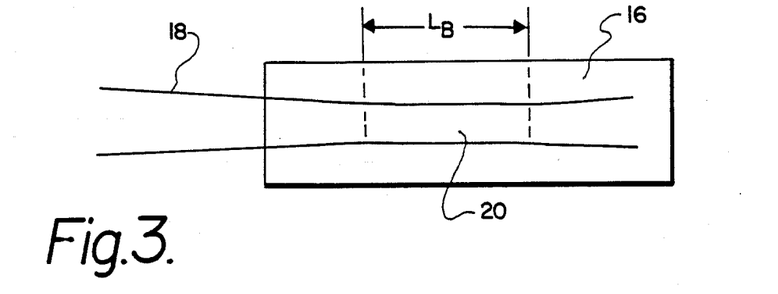
FIG. 3 is a block diagram of an SBS gain medium illustrating the gain length $L_B$.

For phase conjugation applications, the nature of the problem is somewhat different. FIG. 3 illustrates an SBS gain medium 16 in which the diameter of an input pump beam 18 is reduced to a relatively narrow waist 20 within the medium using a lens and/or light guide (not shown). This is typical of pump beams, and most of the phase conjugation takes place in the vicinity of the narrower portion of the pump beam, where the beam intensity is highest. Depending upon the nature of the gain medium, the environmental conditions and the pump beam, SBS buildup will occur over a defined length of the pump beam within the medium. The relative length required for SBS is designated the gain length $L_B$, which is defined as the length over which an SBS gain G of a magnitude equal to the exponential base e is achieved. The SBS gain coefficient g determines the strength of coupling between the pump beam and the phonons, and the speed at which $E_s$ builds up. It is defined by the expression:

$$G = I_{s-out}/I_{s-in} = e^{gI_pL}, \tag{1}$$

where $I_{s-out}$ is the output Stokes beam intensity, $I_{s-in}$ is an assumed Stokes beam intensity that when directed into the medium in the absence of thermal noise would produce $I_{s-out}$, and $I_p$ is the intensity of the pump beam.

The gain length $L_B$ can also be defined by the expression:

$$\frac{1}{L_B} = gI_p. \qquad (2)$$

It is known that phase conjugate fidelity is related to $L_B$, and that in fact fidelity decreases if $L_B$ is too short. See B. Ya Zel'dovich, N. F. Pilipetsky and V. V. Shkunov, *Principles of Phase Conjugation*, Springer-Varlag, New York, 1985, pp. 91-93. In accordance with the invention, this phenomenon is utilized by reducing g to maintain a nearly constant gain length as the pump beam intensity is increased, and thereby combating the tendency towards fidelity deterioration with increasing input intensity.

The novel approach of decreasing medium's SBS gain has applications to SRS as well as phase conjugation. As noted previously, for Raman applications the SBS effects tend to dominate and suppress SRS as the input beam intensity increases. In accordance with the invention, the gain medium for Raman application is also modified at higher input beam intensities by reducing the medium SBS gain. With a proper selection of the ultimate mix for the gain medium, this has been found to reduce SBS effects to the point at which effective SRS action can take place.

Various mechanisms have been identified for reducing SBS gain. It can be shown that the SBS gain coefficient varies as a function of both the gain medium viscosity and thermal conductivity by virtue of the dependence of the Brillouin linewidth $\Gamma$ and the phonon lifetime $\tau$ upon these parameters.

It is well known that the SBS gain coefficient g varies inversely with the Brillouin linewidth; $\Gamma$; the linewidth $\Gamma$ in turn is the inverse of the phonon lifetime $\tau$. Hence, the SBS gain coefficient can be reduced by increasing $\Gamma$ or, equivalently, reducing $\tau$. For a single-component fluid, the expression for $\Gamma$ and $\tau$ is (see. R. D. Mountain, Rev. Mod. Phys. 38, 205, 1966):

$$\frac{1}{\tau} = \Gamma = \frac{k^2}{2}\left[\frac{\frac{4}{3}\eta_s + \eta_v}{\rho} + \frac{\kappa}{\rho C_p}(\gamma - 1)\right] \qquad (3)$$

where $$k = \frac{\omega}{V_s} \qquad (4)$$

$\eta_s$ and $\eta_v$ are respectively the shear and volume viscosities of the medium, $\rho$ is the density, $\kappa$ is the thermal conductivity, $\gamma$ is the ratio of the specific heats, $C_p$ is the specific heat at constant pressure, $\omega$ is the acoustic frequency, and $V_s$ is the sound velocity. The first term in the square brackets represents acoustic attenuation from the viscous effects that tend to dissipate the density variations that constitute the sound wave. The second term accounts for losses due to thermal conduction from the slightly hotter, high density regions, to the slightly cooler, low density regions. Viscosity and thermal conductivity are discussed in general in L. D. Landau and E. M. Lifshitz, "Fluid Mechanics", Pergamon Press, 1959, section 77 (translated from the Russian), pp. 298-302.

The invention contemplates a mixture of two or more gain media having different gain properties, with the proportion of each component tailored to produce an optimum overall SBS gain for the mixture. An analysis of Brillouin scattering from binary mixtures is presented in R. D. Mountain and J. M. Deutch, J. Chem. Phys, 50, 1103 (1969). Although their model is most accurate for mixtures of monotonic gases, it is of interest because it indicates alternative mechanisms by which SBS gain may be reduced. The Brillouin linewidth for a binary mixture is a more complicated version of Equation (3), namely, $$\frac{1}{\tau} = \Gamma = \frac{k^2}{2}\left[\frac{\frac{4}{3}\eta_s + \eta_v}{\rho} + \frac{\kappa}{\rho C_p}(\gamma - 1) + \frac{Dv_s^2}{\rho^2\left(\frac{\partial \mu}{\partial c}\right)_{p,T}}\left[\left(\frac{\partial o}{\partial c}\right)_{p,T} + \frac{k_T}{C_p}\left(\frac{\partial o}{\partial T}\right)_{p,c}\left(\frac{\partial \mu}{\partial c}\right)_{p,T}\right]^2\right] \qquad (5)$$

where D is the diffusion coefficient, c is the concentration, and $\mu$ is the chemical potential. The dimensionless quantity $k_T$ is the thermal diffusion ratio; the product $Dk_T$ gives the diffusion flux due to a temperature gradient. The essential physics represented by Eq. (5) is that, in addition to the contributions from viscosity and thermal conductivity, the Brillouin linewidth depends on diffusion effects. These effects arise whenever there is an appreciable concentration gradient or temperature gradient; both occur as part of a sound wave. Thus, another approach to reducing the SBS gain is by the creation of a gain medium with an increased diffusion coefficient.

Figure 4:
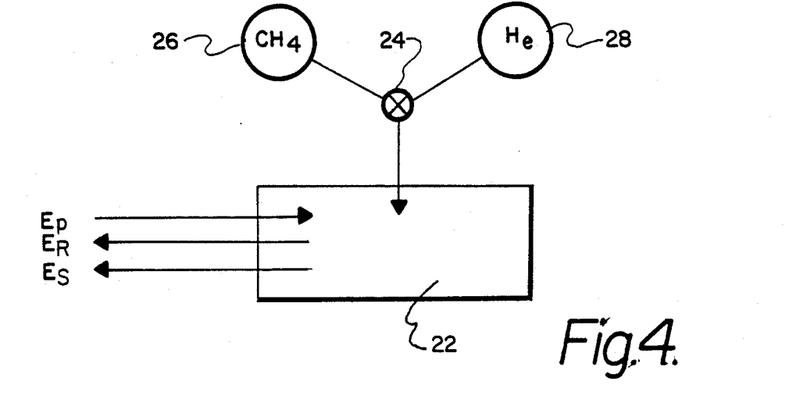
FIG. 4 is a block diagram illustrating one embodiment of the invention.

In accordance with the invention, the gain medium is modified for increased input beam intensities to reduce its SBS gain. A mechanism for accomplishing this in a reliable and monotonic fashion is illustrated in FIG. 4. A pump beam $E_p$ is directed into a gain medium 22, which might be for either a phase conjugate or a Raman scattering application. The scattered and frequency shifted output from a Raman application is indicated by beam $E_R$ (which can go either in the forward or backward direction), while a return Stokes beam for a PCM application is indicated by $E_s$. A valve 24 controls the supply of $CH_4$ and He into the gain medium from respective reservoirs 26 and 28. Other gaseous gain media, or liquids or solids, could also be used, but $CH_4$ is a common medium for Raman applications while He mixes well with $CH_4$ to modify its SBS gain characteristics. A table of the specific viscosities and thermal conductivities of these two gases at representative pressures, as well as $O_2$ which is also of potential use for Raman applications, is presented below:

|  | $CH_4$ | He | $O_2$ | |
| --- | --- | --- | --- | --- |
| PRESSURE, ATM | 20 | 30 | 60 | (6) |
| $\frac{4}{3}\frac{\eta}{\rho}$, cm$^2$/sec | $1 \times 10^{-2}$ | $4.4 \times 10^{-2}$ | $3 \times 10^{-3}$ | |

-continued

| | CH$_4$ | He | O$_2$ |
|---|---|---|---|
| $\frac{\kappa}{\rho C_p}$, cm$^2$/sec | $0.3 \times 10^{-2}$ | $3 \times 10^{-2}$ | $1.3 \times 10^{-3}$ |

Valve 24 can be operated to provide any desired relative proportions of CH$_4$ and He in the gain medium. In general, the SBS gain of the overall gain medium will decrease as more He is added. When the device is initially operated at one input intensity level and then at a higher input intensity level, the proportion of He is increased between the first and second levels to reduce the SBS gain by an appropriate amount. If the input energy is swept progressively upwards, the proportion of He can similarly be increased by progressive amounts, thereby providing a suitable SBS gain for each input energy level. When the device is unused for a period of time between operations at the two input energy levels, it may be desirable to initially provide the gain medium with a relatively larger proportion of CH$_4$ for the lower intensity operation, and then purge the medium and refill it with a relatively larger proportion of He for the higher intensity operation.

Figure 5:
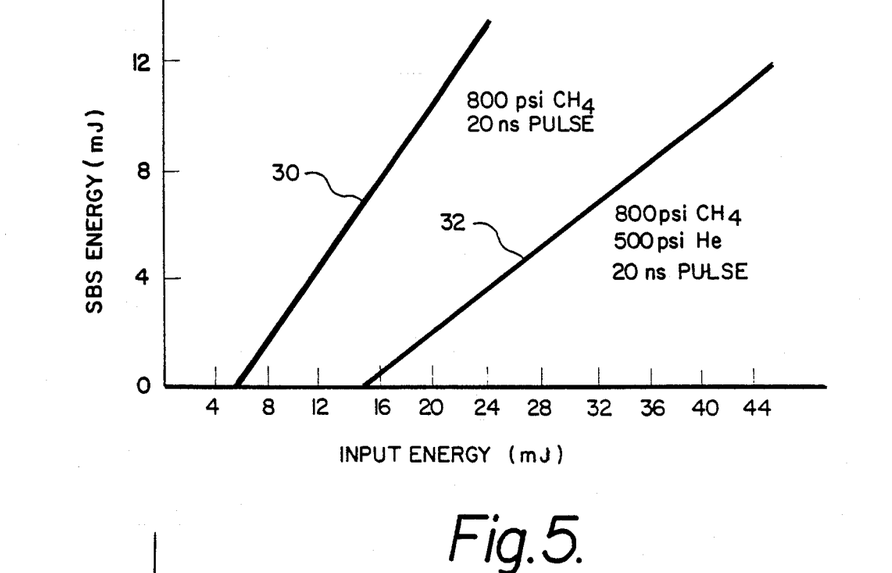
FIG. 5 is a graph showing the suppression of SBS energy achieved with one embodiment of the invention.

Since He has both a greater kinematic viscosity and a greater thermal conductivity than CH$_4$, it would be expected that an appreciable reduction in SBS gain can be achieved by adding He to CH$_4$. Such an SBS gain reduction has in fact been observed. The observations are plotted in FIG. 5, which shows the measures SBS reflectivity as a function of 1.06 μm pump energy for two He partial pressures, both with a CH$_4$ partial pressure of 800 psi. In the left hand plot 30, no He was present, while the right hand plot 32 was made for 500 psig He. A significant reduction in the SBS reflected energy for a given input energy level was noted when He was added.

For SRS applications, the objective of the SBS gain reduction is to reduce the SBS to a level where it no longer suppresses SRS. For PCM applications with appropriate PCM media, the reduction in SBS gain may reduce the useful output energy. However, at the same time it will also increase the fidelity of the output beam to the input beam. Accordingly, for phase conjugation applications there is a trade-off between energy efficiency and fidelity. Since for a given medium the energy efficiency generally increases as the input energy goes up, losses due to intentional reductions in SBS gain at the higher energy levels can generally be held to acceptable amounts.

Figure 6:
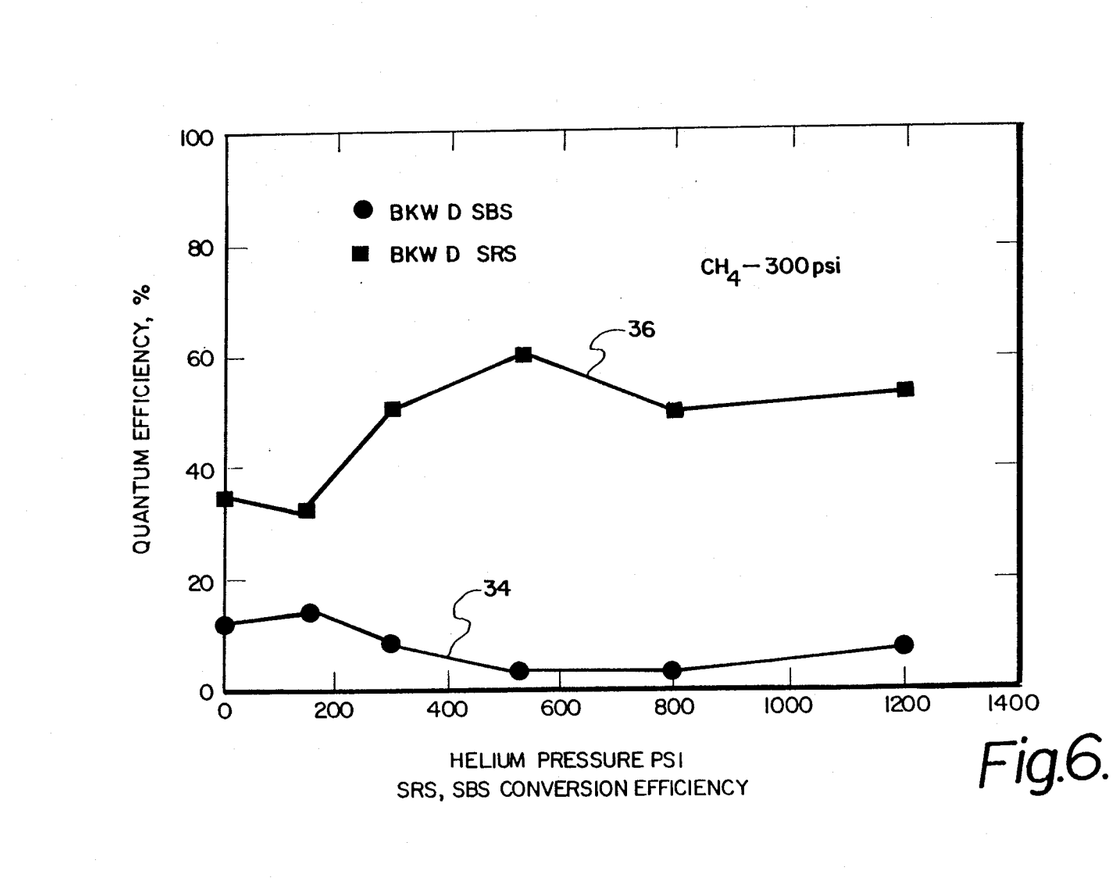
FIG. 6 is a graph showing the results on SRS and SBS conversion efficiency of progressively modifying the gain medium in accordance with the invention.
Figure 7:
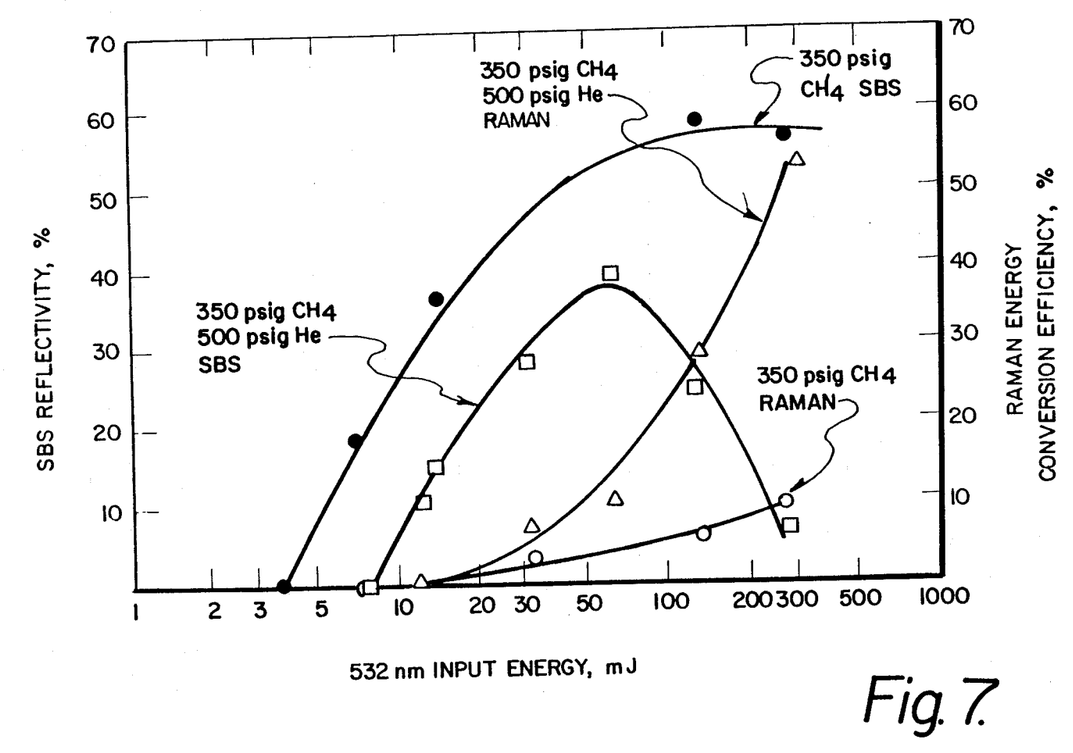
FIG. 7 is a graph of SBS reflectivity and SRS conversion efficiency as a function of input beam energy when the gain medium is modified in accordance with one embodiment of the invention.

Representative results of adding He to CH$_4$ to suppress the SBS gain and thereby enhance the Raman conversion are presented in FIG. 6. The backward SBS beam is indicated by plot 34, while the backward SRS beam is indicated by plot 36. It can be seen that the progressive addition of He to CH$_4$ (at a 300 psi partial pressure) systematically reduces SBS while simultaneously increasing SRS. The same type of behavior is shown in more dramatic form in FIG. 7, which presents the measured SBS reflectivity and SRS conversion efficiency as a function of 532 nm pump energy for two specific helium partial pressures. Not only is a systematic increase in SBS threshold noted, but the SBS reflectivity actually drops as the pump energy increases. Moreover, at the same pump energy at which the SBS reflectivity drops, the backward-Raman conversion efficiency rises. This is an indication that a modification of the gain medium in accordance with the invention reduces the SBS gain and permits SRS to dominate. An additional dissipative mechanism that could be exploited to suppress SBS gain is based upon relaxation effects, which arise when internal degrees of freedom in a molecule such as rotational or vibrational excitations are weakly coupled to the translation degrees of freedom exercised by the sound gratings. Relaxation effects are discussed in R. D. Mountain, J. Res. NBS 72A, 95 (1968), and R. Y. Chiao and P. A. Fleury, *Physics of Quantum Electronics*, P. L. Kelley, B. Lax and P. E. Tannenwald, eds., McGraw-Hill, 1966, page 241. These effects may be included in the hydrodynamic equations by allowing the volume viscosity to have a frequency dependent component. Relaxation effects create dispersion in the sound velocity and affect the Brillouin linewidth. As applied to the present invention, it may be possible to identify a molecule which has a relaxation frequency comparable to the Brillouin freuency of a candidate SBS medium of interest. A mixture of two fluids might possess a lower SBS gain than that of the pure fluid.

Figure 8:
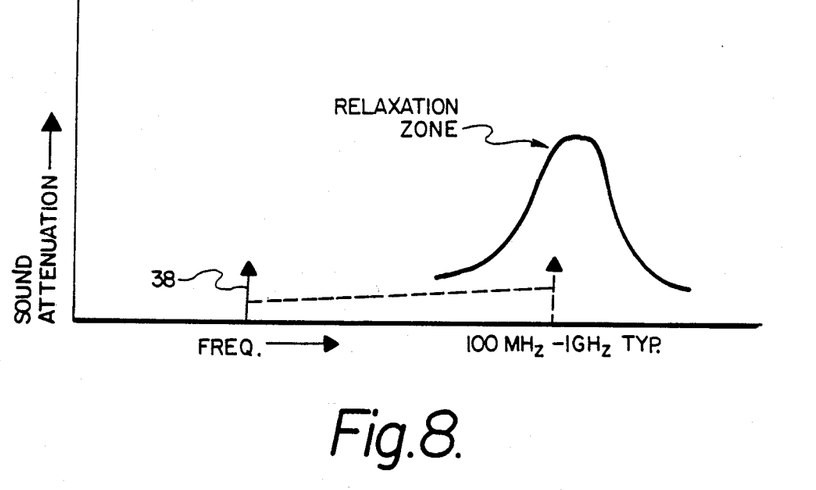
FIG. 8 is a graph illustrating the exploitation of relaxation effects to suppress SBS gain in accordance with the invention.

This approach is illustrated in FIG. 8, in which the degree of sound attenuation is plotted against the phonon frequency. A peak attenuation is recorded in the relaxation zone, which typically occurs on the order of about 100 megahertz-1 gigahertz. If the phonons have a frequency outside the relaxation zone as indicated by arrow 38, an investigation could be conducted to locate the suitable alternate medium or mixture having a relxation zone that more closely coincides with the operating phonon frequency.

The reduction of SBS gain, along with several approaches to implementing the desired SBS gain reduction, has thus been described as a mechanism for either preventing SBS dominance in an SRS system, or increasing the output fidelity in a phase conjugation system. Other applications of the present SBS gain reduction may also appear. Accordingly, it is intended that the invention be limited only in terms of the appended claims.

We claim:

1. A method of enhancing the stimulated Raman scattering (SRS) output of an SRS device at a first output optical beam intensity, said device employing a stimulated Brillouin scattering (SBS) gain medium which couples with a variable intensity input output beam to produce an output beam representing a modification of the input optical beam, comprising:
    providing said gain medium with a first SBS gain coefficient during the application of said first optical intensity so that said gain medium exhibits SBS dominance over SRS at said first input optical beam intensity, and
    modifying the composition of said gain medium to reduce the SBS gain coefficient relative to the SRS gain coefficient of said gain medium to a level at which SBS no longer dominates over SRS.

2. The method of claim 1, wherein said step of providing said gain medium comprises providing a first medium with a first molecular composition having said first SBS gain coefficient at said first input beam intensity, and
    said step of modifying the composition of said gain medium comprises mixing in a second medium with a second molecular composition having an SBS gain coefficient less than said first SBS gain coefficient.

3. The method of claim 2, wherein the optical intensity of said input beam is progressively increased, and progressively larger amounts of said second gain medium are mixed in with said first gain medium for progressively greater input beam intensities.

4. The method of claim 2 wherein providing said first medium comprises providing a first fluid medium and mixing in said second medium comprises mixing in a second fluid medium.

5. The method of claim 1, wherein the optical intensity of said input beam is progressively increased, and said gain medium is progressively modified for progressively greater input beam intensities.

6. The method of claim 1, wherein the gain medium SBS gain coefficient is reduced by increasing its viscosity.

7. The method of claim 1, wherein the gain medium SBS gain coefficient is reduced by increasing its thermal conductivity.

8. The method of claim 1, wherein the gain medium SBS gain coefficient is reduced by increasing its diffusion coefficient.

9. The method of claim 1, wherein the gain medium SBS gain coefficient is reduced by increasing one or more of its viscosity, thermal conductivity or diffusion coefficient.

10. The method of claim 1, wherein the gain medium SBS gain coefficient is reduced by means of the molecular relaxation efficient by altering the medium so that its relaxation zone generally coincides with the frequency of the phonons involved in the SBS process.

11. A method of establishing a gain medium for a stimulated Raman scattering (SRS) optical device which operates upon an input variable intensity optical beam to produce an output optical beam whose wavelength is shifted with respect to the wavelength of the input beam, said SRS being subject to dominance by stimulated Brillouin scattering (SBS), comprising:
   selecting a first intensity level for said input variable intensity optical beam;
   selecting a gain medium whose initial SBS gain coefficient is sufficiently low to avoid SBS dominance of SRS in said gain medium at said intensity level;
   increasing the intensity level to at least a second intensity level at which said initial SBS gain coefficient is not sufficiently low to avoid SBS dominance over SRS, and
   modifying said gain medium responsively to the increase in the intensity level, to establish SRS dominance over SBS at said second level.

12. The method of claim 11, wherein said step of modifying comprises modifying the composition of said gain medium to reduce its initial SBS gain coefficient relative to the SRS gain coefficient at the increased said second intensity level.

13. The method of claim 12, wherein said gain medium initially comprises a first mediun with a first molecular conposition having said initial SBS gain coefficient, and is modified by mixing in a second medium with a second molecular composition having a lesser SBS gain coefficient.

14. The method of claim 13, wherein said first medium is a fluid and said second of mixing in said second medium comprises mixing in a second fluid medium.

15. A method of establishing a gain medium for a phase conjugate mirror (PCM) which operates upon an input optical beam to produce a phase conjugate output beam, comprising:
   providing a gain medium wherein said gain medium initially comprises a first medium with a first molecular composition having an initial SBS gain coefficient, and
   modifying said first medium by mixing in a second medium with a second molecular composition having a lesser SBS gain coefficient, so that the SBS gain coefficient of said medium is sufficiently reduced to produce said output beam with increased output beam fidelity.

16. The method of claim 15, wherein said first medium is a fluid and said step of modifying said first medium by mixing in a second medium comprises mixing in a fluid medium.

17. A method for attenuating stimulated Brillouin scattering (SBS) in a first optical gain medium which is subjected to an input optical beam of varying intensity and in response thereto emits a stimulated output beam, comprising:
   determining the intensity of the input beam, and
   modifying the composition of said gain medium, in response to said intensity determination to reduce its SBS gain coeffient as the input beam intensity increases, by mixing therewith a second gain medium having a lesser SBS gain coefficient than said first gain medium.

18. The method of claim 17, wherein progressively larger amounts of said second gain medium are mixed in with said first gain medium for progressively greater input beam intensities.

19. The method of claim 18, wherein said first medium is a fluid and said step of mixing in said second medium comprises mixing in a fluid medium.

20. The method of claim 17, wherein the gain medium SBS gain coefficient is reduced by increasing its viscosity.

21. The method of claim 17, wherein the gain medium SBS gain coefficient is reduced by increasing its thermal conductivity.

22. The method of claim 17, wherein the gain medium SBS gain coefficient is reduced by increasing its diffusion coefficient.

23. The method of claim 17, wherein the gain medium SBS gain coefficient is reduced by increasing one or more of its viscosity, thermal conductivity or diffusion coefficient.

24. The method of claim 17, wherein the gain medium SBS gain coefficient is reduced by means of the molecular relaxation effect by altering the medium so that its relaxation zone generally coincides with the frequency of the phonons involved in the SBS process.

25. A stimulated Raman scattering (SRS) device for producing an SRS output in response to an optical beam input, comprising:
   a Raman gain medium which exhibits stimulated Brillouin scattering (SBS) in response to an optical beam directed at the medium, said SBS dominating the SRS response above a threshold input beam intensity, and
   means for modifying said gain medium in response to input optical beam intensities above said threshold level to decrease the medium SBS gain coefficient to a level at which the SRS response is no longer suppressed by SBS.

26. The SRS device of claim 25, said modifying means comprising means for modifying composition of said gain medium.

27. The SRS device of claim 26, said modifying means comprising means for mixing first and second media having different SBS gain coefficients in desired proportions to form said modified gain medium.

28. A phase conjugate mirror (PCM), comprising:
a stimulated Brillouin scattering (SBS) gain medium which produces a phase conjugate output beam in response to an input optical beam, the fidelity of the output beam to the input beam decreasing with increasing input beam intensity, and
means for modifying said gain medium in response to an increase in the input beam intensity to decrease the medium SBS gain coefficient and thereby increase the output eam fidelity at said increased intensity.

29. The PCM of claim 28, said modifying means comprising means for modifying the composition of said gain medium.

30. The PCM of claim 29, said modifying means comprising means for mixing first and second media having different SBS gain coefficients in desired proportions to form said modified gain medium.

* * * * *